United States Patent
Duncan et al.

(10) Patent No.: US 9,373,870 B2
(45) Date of Patent: Jun. 21, 2016

(54) BATTERY DAMAGE INDICATOR

(71) Applicant: Elwha, LLC, Bellevue, WA (US)

(72) Inventors: William David Duncan, Kirkland, WA (US); Roderick A. Hyde, Richmond, WA (US); Jordin T. Kare, Seattle, WA (US); David B. Tuckerman, Lafayette, CA (US)

(73) Assignee: ELWHA LLC, Bellevue, WA (US)

( * ) Notice: Subject to any disclaimer, the term of this patent is extended or adjusted under 35 U.S.C. 154(b) by 258 days.

(21) Appl. No.: 13/837,695

(22) Filed: Mar. 15, 2013

(65) Prior Publication Data

US 2014/0272498 A1 Sep. 18, 2014

(51) Int. Cl.
*H01M 2/02* (2006.01)
*H01M 6/50* (2006.01)
*H01M 10/42* (2006.01)
*H01M 10/48* (2006.01)
*H01M 2/10* (2006.01)
*H01M 2/12* (2006.01)
*H01M 2/08* (2006.01)

(52) U.S. Cl.
CPC ............ *H01M 10/48* (2013.01); *H01M 2/1022* (2013.01); *H01M 2/1072* (2013.01); *H01M 2/1223* (2013.01); *H01M 2/1235* (2013.01); *H01M 10/425* (2013.01); *H01M 10/488* (2013.01); *H01M 2/08* (2013.01); *H01M 2010/4278* (2013.01); *H01M 2220/20* (2013.01); *H01M 2220/30* (2013.01)

(58) Field of Classification Search
USPC .................. 429/61–64, 90–93, 163–187; 29/623.1–623.5
See application file for complete search history.

(56) References Cited

U.S. PATENT DOCUMENTS

| | | | | |
|---|---|---|---|---|
| 2,447,069 A * | 8/1948 | Holcomb, Jr. | .......... | B63B 49/00 367/3 |
| 4,100,333 A * | 7/1978 | Haas | ................... | H01M 2/0245 429/156 |
| 5,399,445 A * | 3/1995 | Tinker | ...................... | H01G 9/08 429/90 |
| 6,138,516 A * | 10/2000 | Tillman | ................... | G01H 1/16 340/429 |
| 6,881,382 B2 * | 4/2005 | Goldstein et al. | ............. | 422/123 |
| 8,182,937 B2 * | 5/2012 | Davis et al. | ..................... | 429/91 |
| 2005/0069761 A1* | 3/2005 | Palanisamy et al. | ........... | 429/90 |
| 2008/0014499 A1* | 1/2008 | Ling | ................... | H01M 2/0242 429/163 |
| 2010/0308995 A1* | 12/2010 | Goto | ....................... | G08B 1/00 340/540 |
| 2011/0189514 A1 | 8/2011 | Lee et al. | | |
| 2011/0212349 A1* | 9/2011 | Naruse | ................ | H01M 10/486 429/50 |
| 2013/0017421 A1 | 1/2013 | Onnerud et al. | | |

* cited by examiner

*Primary Examiner* — Basia Ridley
*Assistant Examiner* — Caitlin Wilmot

(57) ABSTRACT

The present disclosure provides systems and methods for indicating battery damage. A battery may comprise an odorant and/or visible indicator material configured to be released in response to battery damage. The battery may be configured to release the odorant and/or visible indicator in response to damage to the battery housing, a cell or cells in the battery, a seal of the battery, or any other specific component of the battery. The odorant and/or visible indicator may be stored in free space in the battery housing, a battery cell, or other battery component. The battery may be configured to emit an audible and/or visible indication of battery damage in addition to releasing the odorant and/or visible indicator.

26 Claims, 19 Drawing Sheets

BATTERY DAMAGE INDICATOR

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

NONE

RELATED APPLICATIONS

U.S. patent application Ser. No. 13/837,720, entitled BATTERY DAMAGE INDICATOR, naming William D. Duncan, Roderick A. Hyde, Jordin T. Kare, and David B. Tuckerman as inventors, filed Mar. 15, 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates to systems and methods for indicating battery damage. More specifically, this disclosure relates to odorants, visible indicators, and/or audible signals that indicate a battery has been damaged.

SUMMARY

Batteries, particularly high energy rechargeable batteries, are in widespread use in consumer electronics and electric or hybrid-electric vehicles. As electric and hybrid-electric vehicles become more prevalent, an increase in the number and size of high energy rechargeable batteries is expected. One concern with high energy rechargeable batteries is the safety of a battery. For example, reports of fires caused by damaged lithium ion batteries have been increasing as batteries become more widespread. Similarly, damaged batteries are of particular concern to emergency response personnel responding to an accident involving an electric vehicle. Accordingly, it is advantageous to provide a system and method for indicating battery damage without having to physically inspect the battery or its components.

In some embodiments, a battery may comprise a battery damage indicator configured to release an odorant in response to battery damage. The battery damage indicator may be configured to release the odorant in response to damage to the battery housing, a cell or cells in the battery, a seal of the battery, or any other specific component of the battery. In some embodiments, the odorant may be stored in free space in the battery housing, a battery cell, or other battery component. In other embodiments, the damage indicator may comprise a dedicated container configured to store the odorant. In some embodiments, the battery damage indicator may be configured to emit an audible and/or visible indication of battery damage in addition to releasing the odorant.

In some embodiments, a battery may comprise a battery damage indicator configured to release a visible indicator in response to battery damage. The battery damage indicator may be configured to release the visible indicator in response to damage to the battery housing, a cell or cells in the battery, a seal of the battery, or any other specific component of the battery. In some embodiments, the visible indicator material may be stored in free space in the battery housing, a battery cell, or other battery component. In other embodiments, the damage indicator may comprise a dedicated container configured to store the visible indicator material. In some embodiments, the battery damage indicator may be configured to emit an audible indication of battery damage and/or an odorant in addition to releasing the visible indicator.

DETAILED DESCRIPTION

Some of the infrastructure that can be used with embodiments disclosed herein is already available, such as general-purpose computers, computer programming tools and techniques, digital storage media, and communication networks. A computing device may include a processor such as a microprocessor, microcontroller, logic circuitry, or the like. The processor may include a special purpose processing device such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

Figure 1:
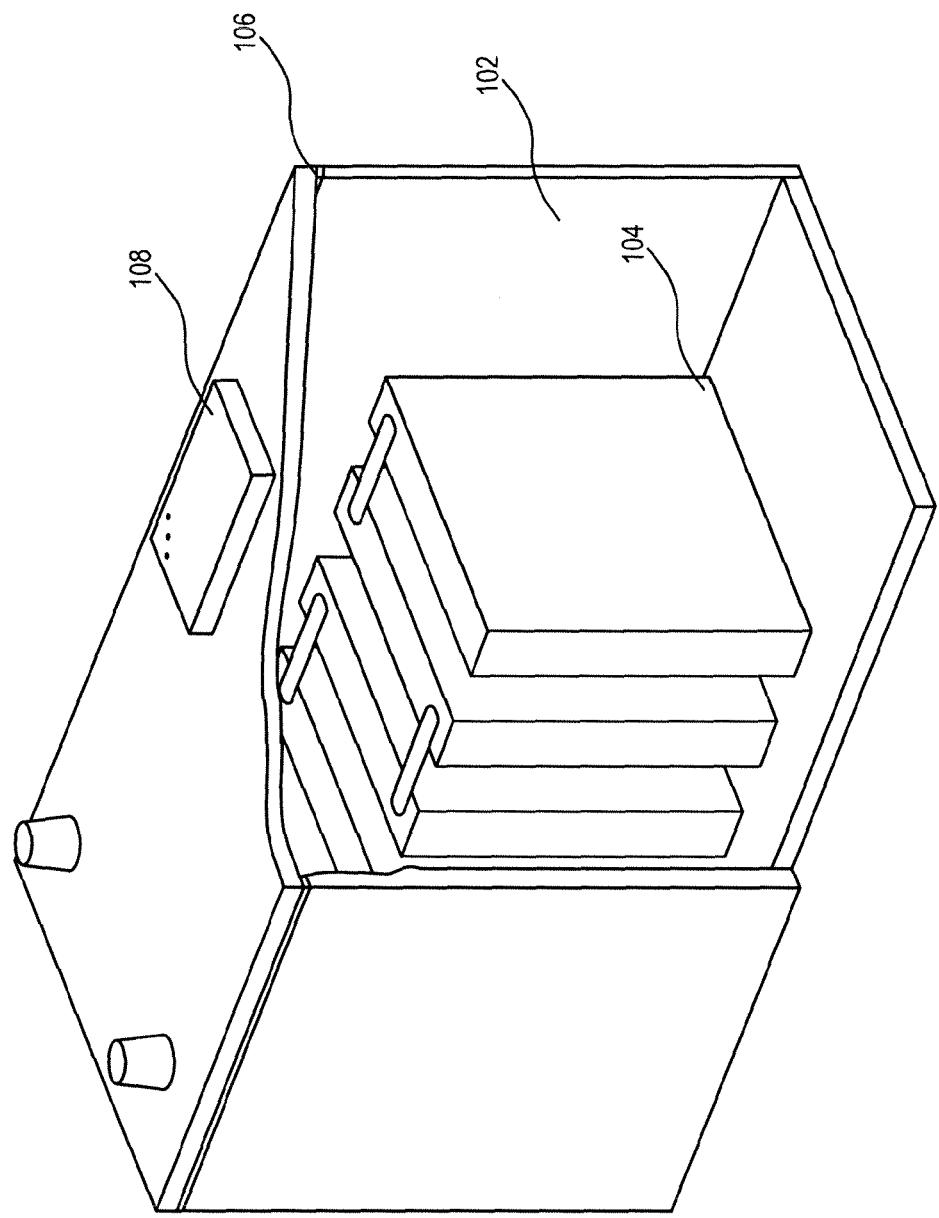
FIG. 1 illustrates a cutaway view of an example battery including a battery damage indicator.

FIG. 1 illustrates a cutaway view of an example battery. The battery may include a battery housing 102, a battery cell 104, a seal 106, and other conventional battery components. In various embodiments, the battery housing 102 and/or battery cell 104 may include an odorant and/or visible indicator material, described below, that is configured to be released when the battery is damaged. The example battery of FIG. 1 further includes a vent 108 to allow the odorant and/or visible indicator material to be released from the battery housing 102. As shown in the example of FIG. 1, the vent 108 is coupled with the outside of the battery housing 102. However, in some embodiments, the vent 108 may be coupled with or integrated into the seal 106, or at various other locations on or throughout the battery as appropriate to indicate damage to one or more parts of the battery. In some embodiments, multiple vents may be coupled with a battery. Alternatively, a burst disk, or other release mechanism, configured to release the odorant and/or visible indicator material may be used in place of vent 108.

The example battery of FIG. 1 may be, for example, configured to provide power to a vehicle and may therefore be configured to be installed in an electric vehicle (EV) or a hybrid electric vehicle (HEV). In other embodiments, the battery may be configured to power a portable computing device, such as a notebook computer, netbook, tablet, etc. In some embodiments, the battery may be configured to be incorporated into a personal electronic device, such as a mobile phone, tablet, personal digital assistant, audio/video players, etc. While specific examples of battery uses are provided above, it should be apparent that the techniques introduced herein may be applied to any potentially hazardous battery or battery assembly.

Figure 2A:
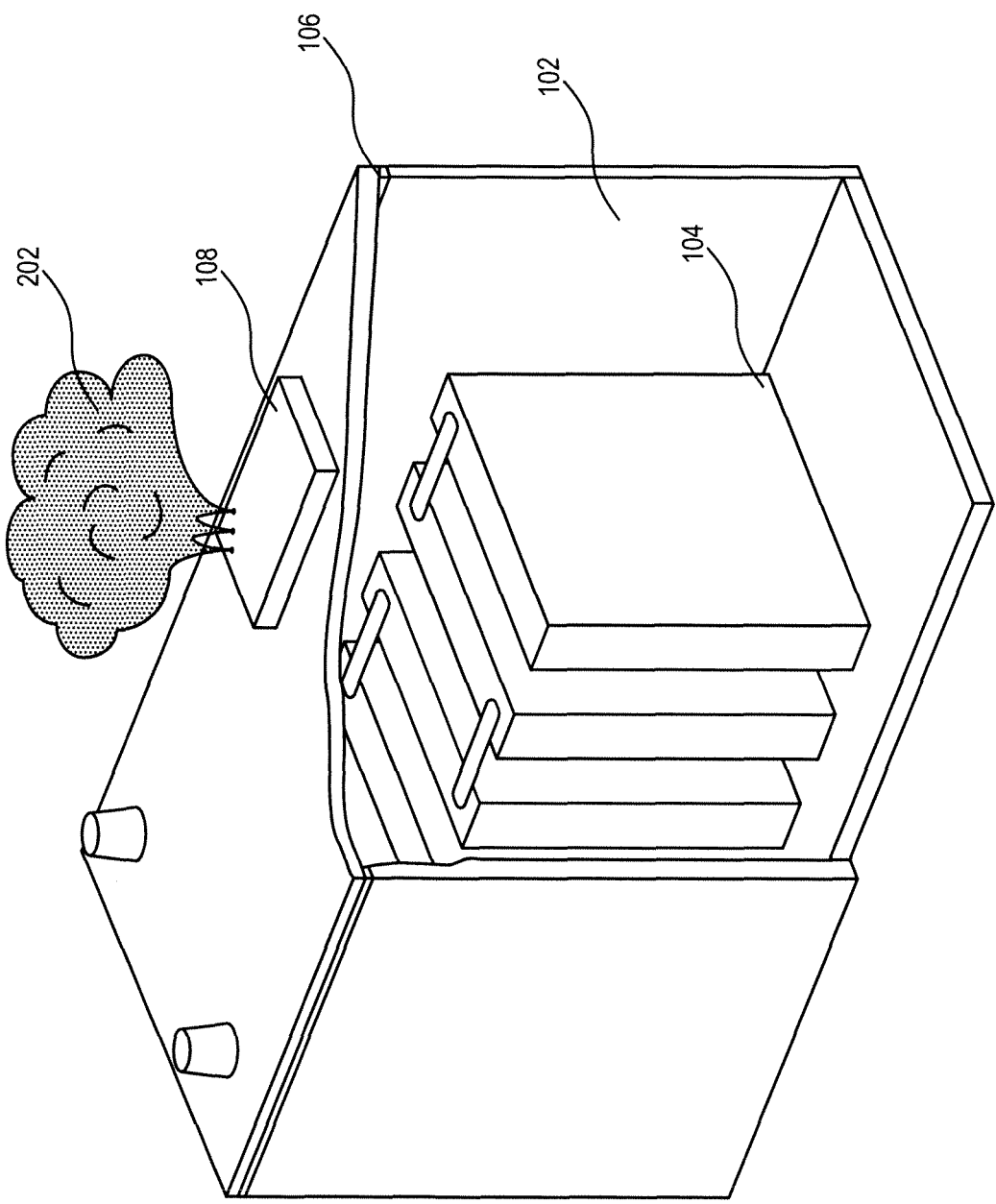
FIG. 2A illustrates a battery configured to release an odorant.

FIG. 2A illustrates a battery configured to release an odorant 202 in response to battery damage. The odorant 202, when released, may provide an olfactory warning that the battery has been damaged. This olfactory warning may provide a similar indication of potential danger to emergency responders as that of the odorants introduced into natural gas. In some embodiments, propanol, various mercaptans, (e.g., methyl ethyl, i-propyl, n-propyl, n-butyl, i-butyl, t-butyl, etc.), dimethyl sulfide (or various other sulfides, including H2S), thiophane, tetrahydrothiophene, butyl or ethyl isocyanide mixed with various combinations of 2-hexyne and 1 penthyne, or any other known or custom designed odorant may be used as odorant 202.

In some embodiments, the odorant 202 may be stored as a liquid. In other embodiments, the odorant 202 may be stored as a gas or in combination with an inert carrier gas. In some embodiments the odorant 202 may be stored under pressure. In some embodiments, the odorant 202 may be stable until exposed to particular conditions. For example, the odorant 202 may be stable until exposed to ambient air or to a specific temperature that may indicate battery damage. In other embodiments, the odorant 202 may be volatile prior to being released or exposed to any defined conditions. In other embodiments, the battery may include two or more precursor chemicals that are configured to be released in response to battery damage, to react, when mixed, and create the odorant 202. In other embodiments, the battery may include one or more precursor chemicals configured to react to defined conditions, such as exposure to ambient air or humidity, or heat above a threshold temperature, and create the odorant 202.

Figure 2B:
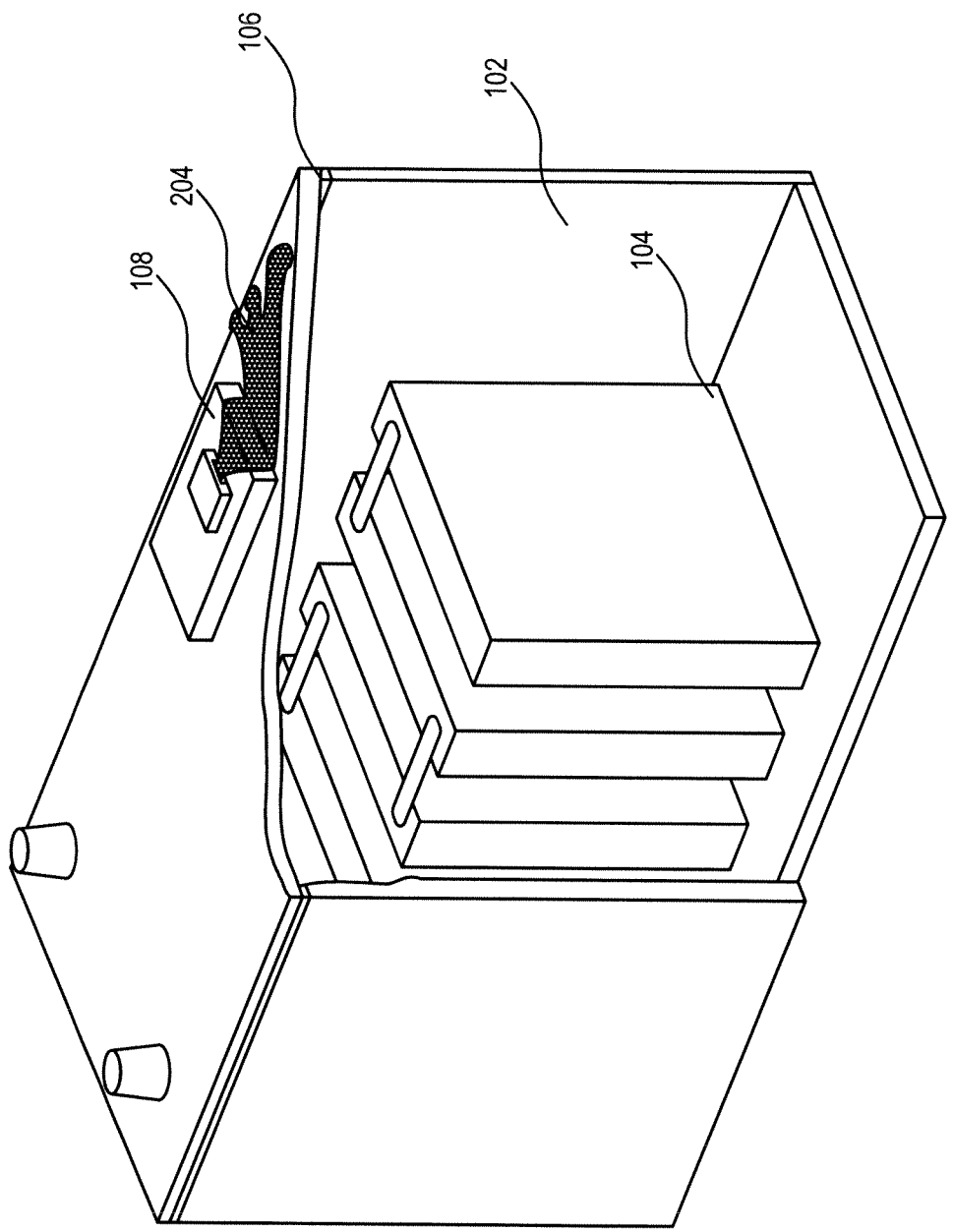
FIG. 2B illustrates a battery configured to release a visible indicator material.

FIG. 2B illustrates a vent 108 configured to release a visible indicator material 204. The visible indicator material 204, when released, may provide a visible warning that the battery has been damaged. In some embodiments, the visible indicator material 204 may be functionally liquid, i.e., a visible indicator material that flows from the battery but is not airborne. In other embodiments, the visible indicator material 204 may be airborne such as smoke, a fine powder dispersed by pressurized gas, a mist, an aerosol, or the like.

In some embodiments, the visible indicator material 204 may comprise a liquid. The liquid may include a permanent dye, a removable dye, a pigment, a fluorescent material, a luminescent material, and/or a fire retardant. In some embodiments, the visible indicator material 204 may comprise a powder. The powder may include a permanent dye, a removable dye, a pigment, a fluorescent material, a luminescent material, and/or a fire retardant. In some embodiments, the visible indicator material 204 may comprise a foam. In some embodiments, the visible indicator material 204 may comprise a foaming agent that produces foam when released. In some embodiments, the foaming agent may be an additive (e.g., $CO_2$) that produces bubbles in a liquid visible indicator material and/or an additive that causes the bubbles that reach the surface of the liquid visible indicator material to be stable and form a foam (e.g., as in a detergent or glycerin). The foam may include a permanent dye, a removable dye, a pigment, a fluorescent material, a luminescent material, and/or a fire retardant.

In some embodiments, the visible indicator material 204 may be stored as a liquid. In other embodiments, the visible indicator material 204 may be stored as a gas or in combination with an inert carrier gas. In some embodiments the visible indicator material 204 may be stored under pressure, e.g., the visible indicator material may be stored under pressure using a dissolved or discrete propellant. In some embodiments, the visible indicator material 204 may be stable until exposed to particular conditions. For example, the visible indicator material 204 may be stable until exposed to ambient air or to a specific temperature that may indicate battery damage. In other embodiments, the visible indicator material 204 may be volatile prior to being released or exposed to any defined conditions. In other embodiments, the battery may include two or more precursor chemicals that are configured to be released in response to battery damage, to react, when mixed, and create the visible indicator material 204. In other embodiments, the battery may include one or more precursor chemicals configured to react to defined conditions, such as exposure to ambient air or humidity, or heat above a threshold temperature, and create the visible indicator material 204.

In some embodiments, the vent 108 may release an odorant 202 and a visible indicator material 204 in combination. In some embodiments, the vent 108, or multiple vents, may release an odorant 202 and a visible indicator 204 separately, but in response to a single instance of battery damage. In some embodiments, a plurality of precursors may create both the odorant 202 and the visible indicator material 204 when mixed in response to battery damage.

In various embodiments, the battery may be configured to release the odorant 202 and/or visible indicator material 204 in response to damage to the battery housing 102. Damage to the battery housing 102 may include, for example, a puncture, a crack, excessive heat, deformation, etc. In other embodiments, the vent 108 may be configured to allow an odorant 202 and/or visible indicator material 204 to escape the battery housing in response to damage to a battery cell 104. Damage to the battery cell 104 may include, for example, a puncture, a crack, excessive heat, deformation, etc. In other embodiments, the battery may be configured to release the odorant 202 and/or visible indicator material 204 in response to damage to a seal 106. Damage to the battery seal 106 may include, for example, a puncture, a crack, excessive heat, deformation, etc.

In various embodiments, the battery may include passive elements configured to indicate battery damage. For example, the battery may comprise a dedicated container or containers (as described in more detail below) configured to store the odorant 202 and/or visible indicator material 204. When the battery is damaged, the dedicated container storing the odorant 202 and/or visible indicator material 204 may also be damaged thereby releasing its contents to indicate damage to the battery.

In other embodiments, the battery may include active elements configured to detect certain conditions and trigger a release of the odorant 202 and/or visible indicator material 204. For example, in one embodiment, the battery may include an accelerometer configured to detect the acceleration and deceleration of the battery. In response to detecting an acceleration or deceleration of the battery above a certain threshold that may indicate damage, the accelerometer may trigger a release of the odorant 202 and/or visible indicator material 204. In another embodiment, the battery may include a force meter, a strain sensor, and/or a fracture sensor configured to measure a mechanical force applied to the battery and trigger a release of the odorant 202 and/or visible indicator material in response to a force greater than a defined threshold. In some embodiments, the battery may include an electrolyte sensitive actuator or chemical sensor configured detect electrolyte and to release the odorant 202 and/or visible indicator material 204 in response to detecting electrolyte outside of the battery cell 104. In various embodiments, the active elements of the battery may be located on or within the battery. In other embodiments, the active elements may be located remotely from the battery and may indicate battery damage by transmitting electrical or other signals.

Figure 3:
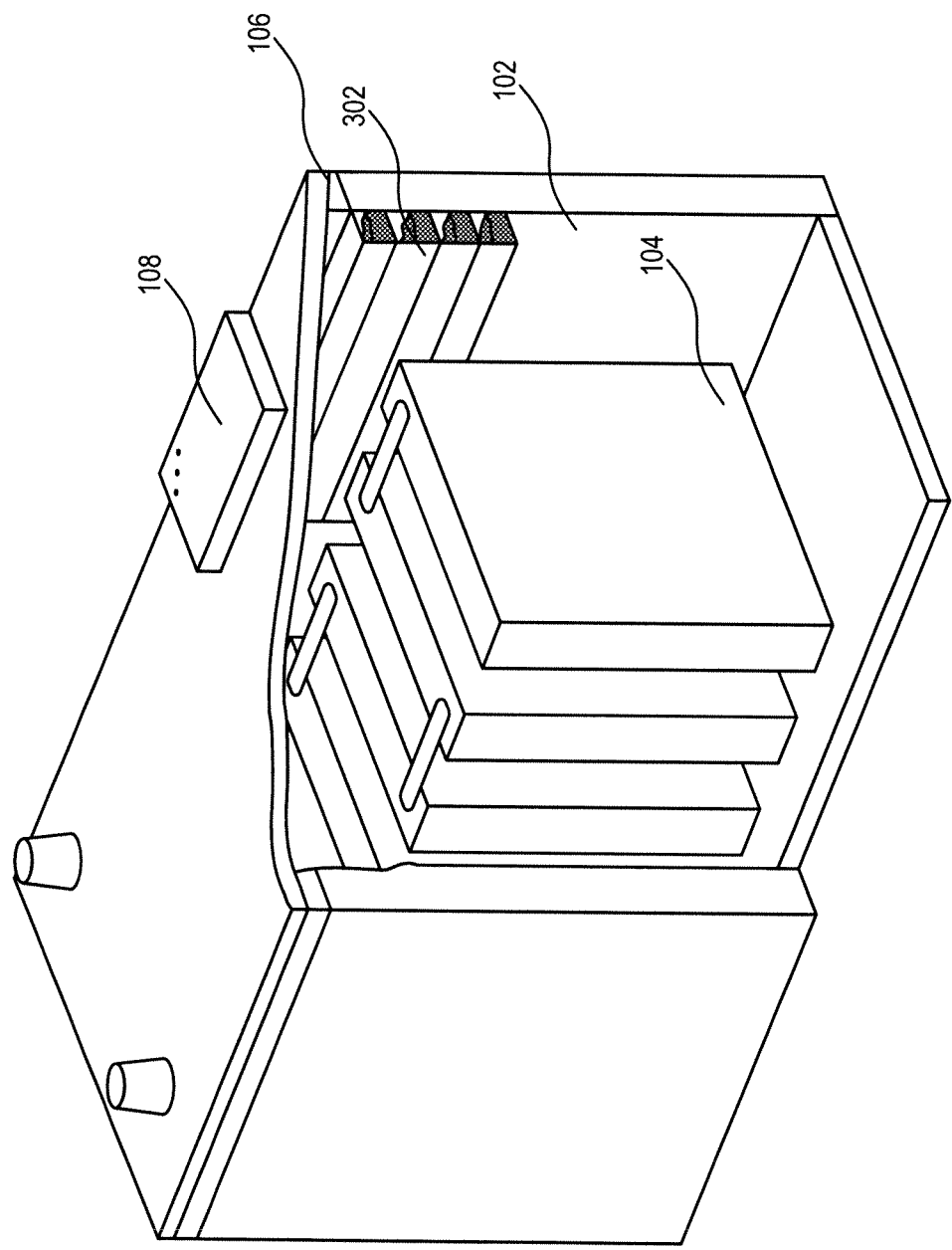
FIG. 3 illustrates an example battery including an odorant and/or visible indicator material stored in the battery housing.

FIG. 3 illustrates an example battery including an odorant and/or visible indicator material stored in the battery housing. As shown in the example of FIG. 3, the odorant 202 and/or visible indicator material 204 may be stored in a dedicated container or containers 302 in free space within the battery housing 102. In various embodiments, the dedicated container 302 may include a vial, a tube, a bladder, or the like. In some embodiments, the dedicated container 302 may be formed of a rigid material, such as plastic or glass, configured to break and release the odorant 202 and/or visible indicator material 204 in response to battery damage. While FIG. 3 depicts the odorant 202 and/or visible indicator material 204 being stored in a dedicated container, in other embodiments, the odorant 202 and/or visible indicator material 204 may be stored in the free space of the battery housing 102 without being separately contained in a dedicated container.

Figure 4:
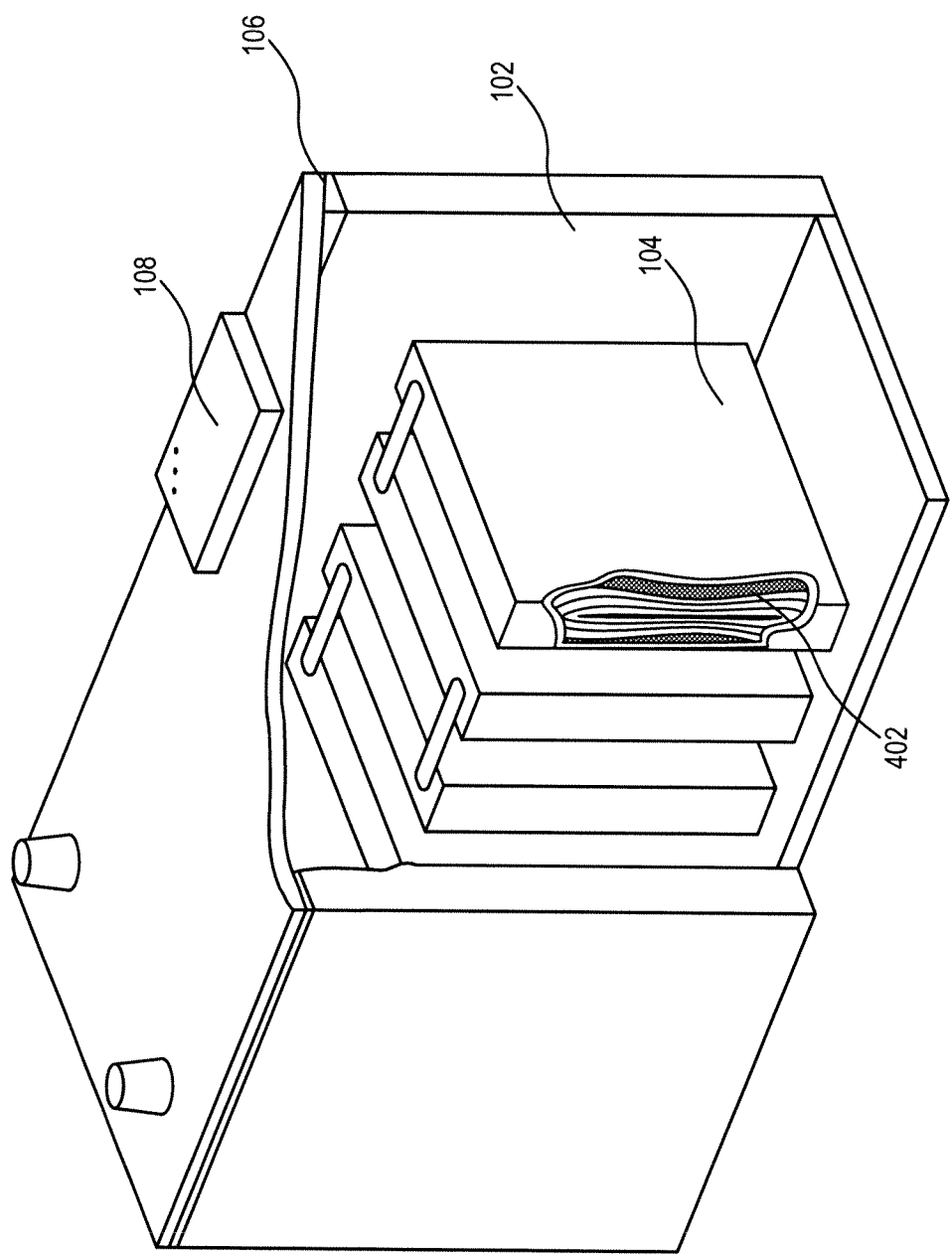
FIG. 4 illustrates an example battery including an odorant and/or visible indicator material stored in the battery cell.

FIG. 4 illustrates an example battery including an odorant and/or visible indicator material stored in the battery cell. As shown in the example of FIG. 4, the odorant and/or visible indicator material 402 may be stored in free space within a battery cell 104. While FIG. 4 depicts the odorant and/or visible indicator material being stored in free space in the battery cell, in other embodiments, the odorant and/or visible indicator material may be stored in a dedicated container or containers in the free space of a sealed battery cell. In various embodiments, the dedicated container may include a vial, a tube, a bladder, or the like. In some embodiments, the dedicated container may be formed of a rigid material, such as plastic or glass, configured to break and release the odorant and/or visible indicator material in response to battery damage.

Figure 5:
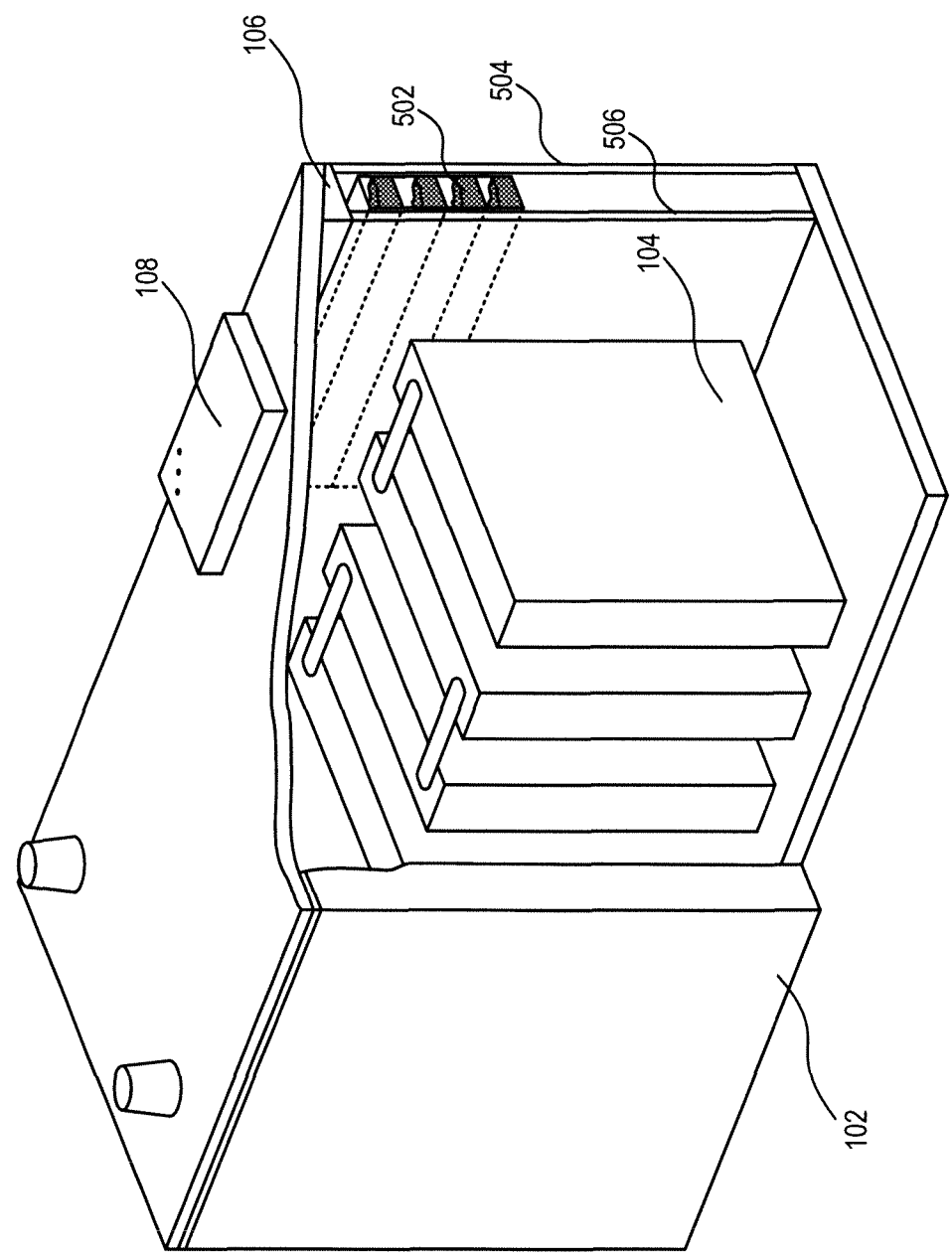
FIG. 5 illustrates an example battery including an odorant and/or visible indicator material stored within a battery housing wall.

FIG. 5 illustrates an example battery including an odorant and/or visible indicator material stored within a battery housing wall. In some embodiments, the battery housing 102 may be formed of a plurality of battery housing walls 504 and 506. As shown in FIG. 5, the odorant 202 and/or visible indicator material 204 may be stored in a dedicated container or containers 502 in free space within the space between battery housing walls 504 and 506. In various embodiments, the dedicated container 502 may include a vial, a tube, a bladder, or the like. In some embodiments, the dedicated container 502 may be formed of a rigid material, such as plastic or glass, configured to break and release the odorant 202 and/or visible indicator material 204 in response to battery damage. While FIG. 5 depicts the odorant 202 and/or visible indicator material 204 being stored in a dedicated container 502, in other embodiments, the odorant 202 and/or visible indicator material 204 may be stored in the free space between battery housing walls 504 and 506 without being separately contained in a dedicated container.

Figure 6:
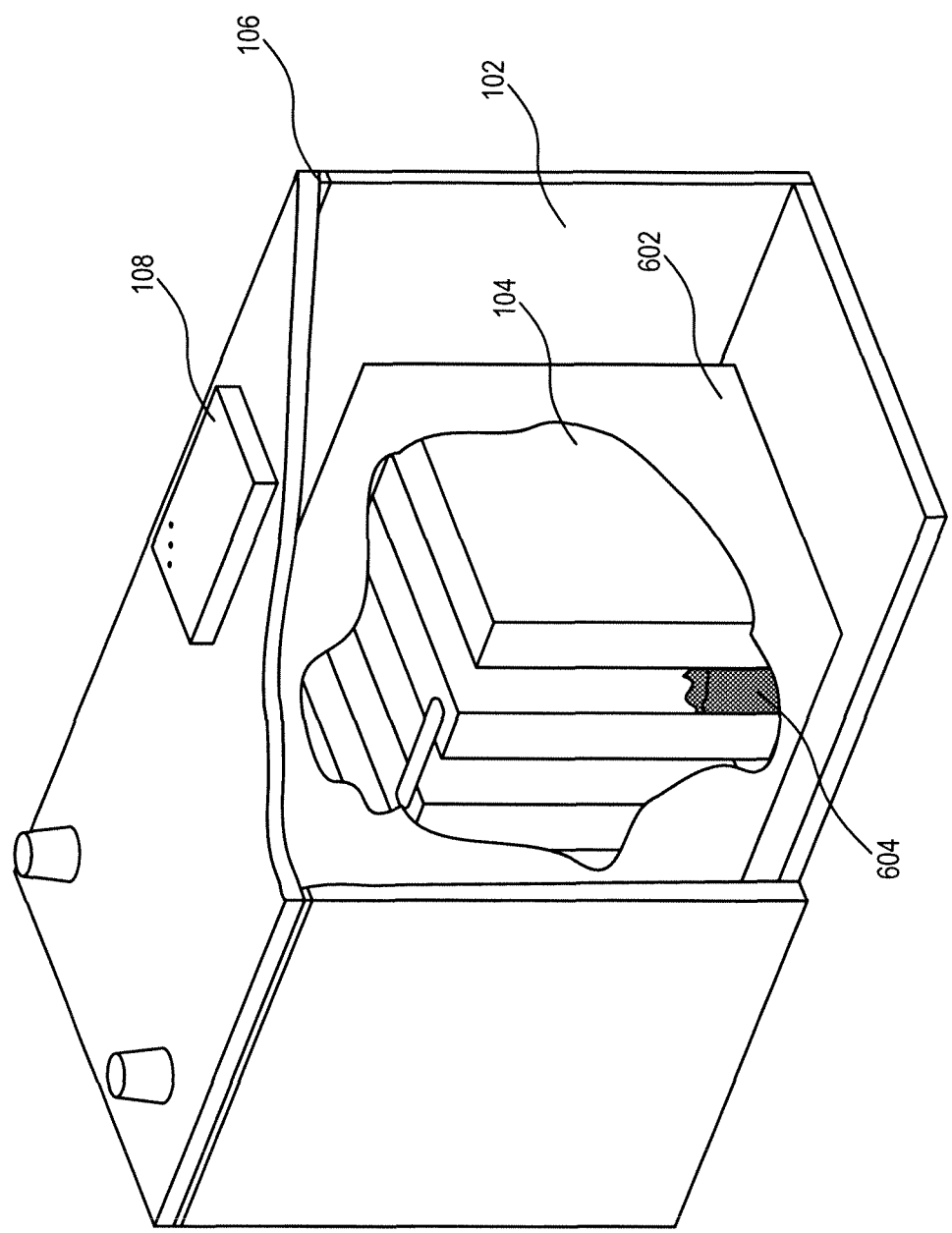
FIG. 6 illustrates an example battery including an odorant and/or visible indicator material configured to surround the battery cell.

FIG. 6 illustrates an example battery including an odorant and/or visible indicator material configured to surround the battery cell. As shown in FIG. 6, the battery cell 104 may be surrounded by a sealed wrapper 602. In some embodiments, the sealed wrapper 602 may surround all of the battery cells, a single battery cell, or a subset of the battery cells. In other embodiments, multiple sealed wrappers may surround various groups of battery cells. In some embodiments, the sealed wrapper may contain an odorant and/or visible indicator material 604. The odorant and/or visible indicator material 604 of FIG. 6 is shown occupying free space between battery cells 104, however, as described above, the odorant and/or visible indicator material may be stored in a dedicated container within the sealed wrapper 602. The sealed wrapper 602 may be configured to release the odorant and/or visible indicator material 604 in response to battery damage. In some embodiments, the sealed wrapper itself may be damaged and therefore release the odorant and/or visible indicator material 604, indicating possible battery damage.

Figure 7:
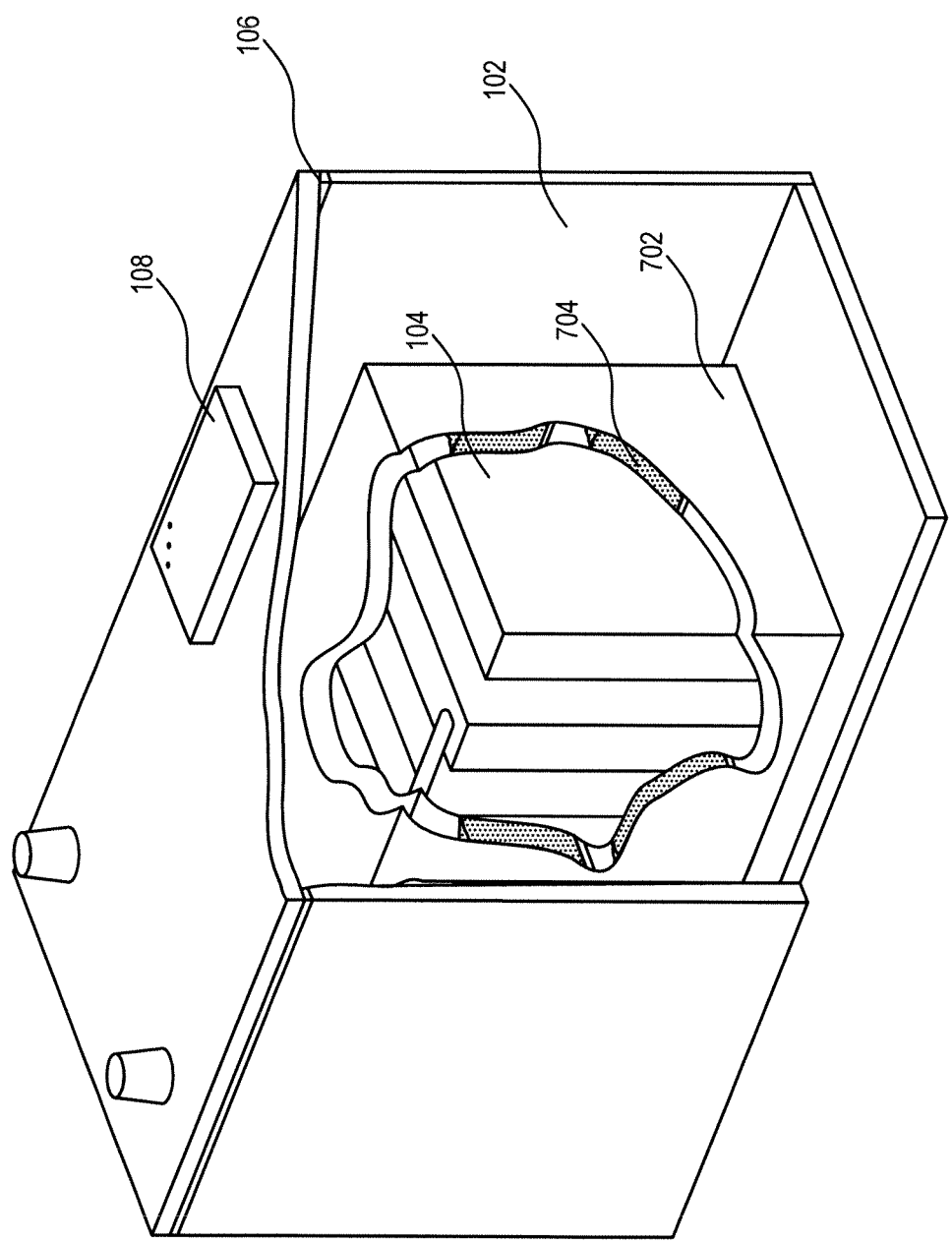
FIG. 7 illustrates an example battery including an odorant and/or visible indicator material configured to surround the battery cell.

FIG. 7 illustrates an example battery including an odorant and/or visible indicator material configured to surround the battery cell. Similar to FIG. 6 described above, the battery cell 104 in the example of FIG. 7 may be surrounded by a sealed wrapper 702. However, as shown in FIG. 7, the sealed wrapper 702 may include multiple walls which surround the battery cells 104 and the odorant and/or visible indicator material 704 may be stored between the sealed wrapper walls.

Figure 8:
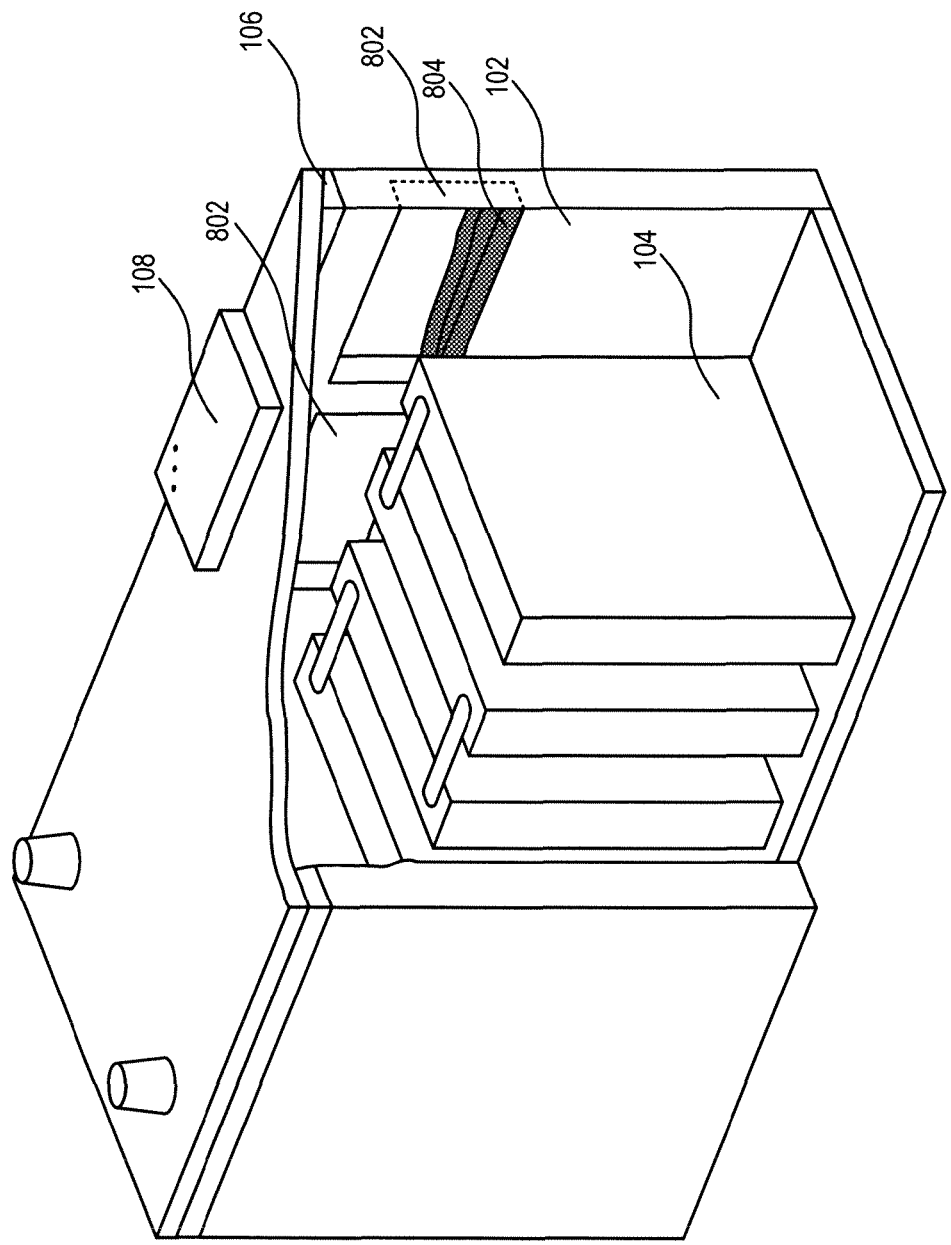
FIG. 8 illustrates an example battery including an odorant and/or visible indicator material stored in a plurality of storage compartments within the battery.

FIG. 8 illustrates an example battery including an odorant and/or visible indicator material stored in a plurality of storage compartments within the battery. In various embodiments, the battery may include a plurality of storage compartments 802 configured to store the odorant and/or visible indicator material 804. The odorant and/or visible indicator material 804 may be stored freely within the storage compartments 802 or may be further enclosed in a dedicated container within the storage compartments 802. In one embodiment, the battery may include a plurality of small storage compartments 802 (e.g., microsphere compartments), each including an amount of the odorant and/or visible indicator material 804. In response to battery damage, a subset of the microsphere compartments may be damaged and therefore release their contents to indicate battery damage. In a case of severe battery damage, more of the small storage compartments 802 may be damaged and a greater amount of odorant and/or visible indicator material may be released, thereby indicating the extent of the damage.

Figure 9:
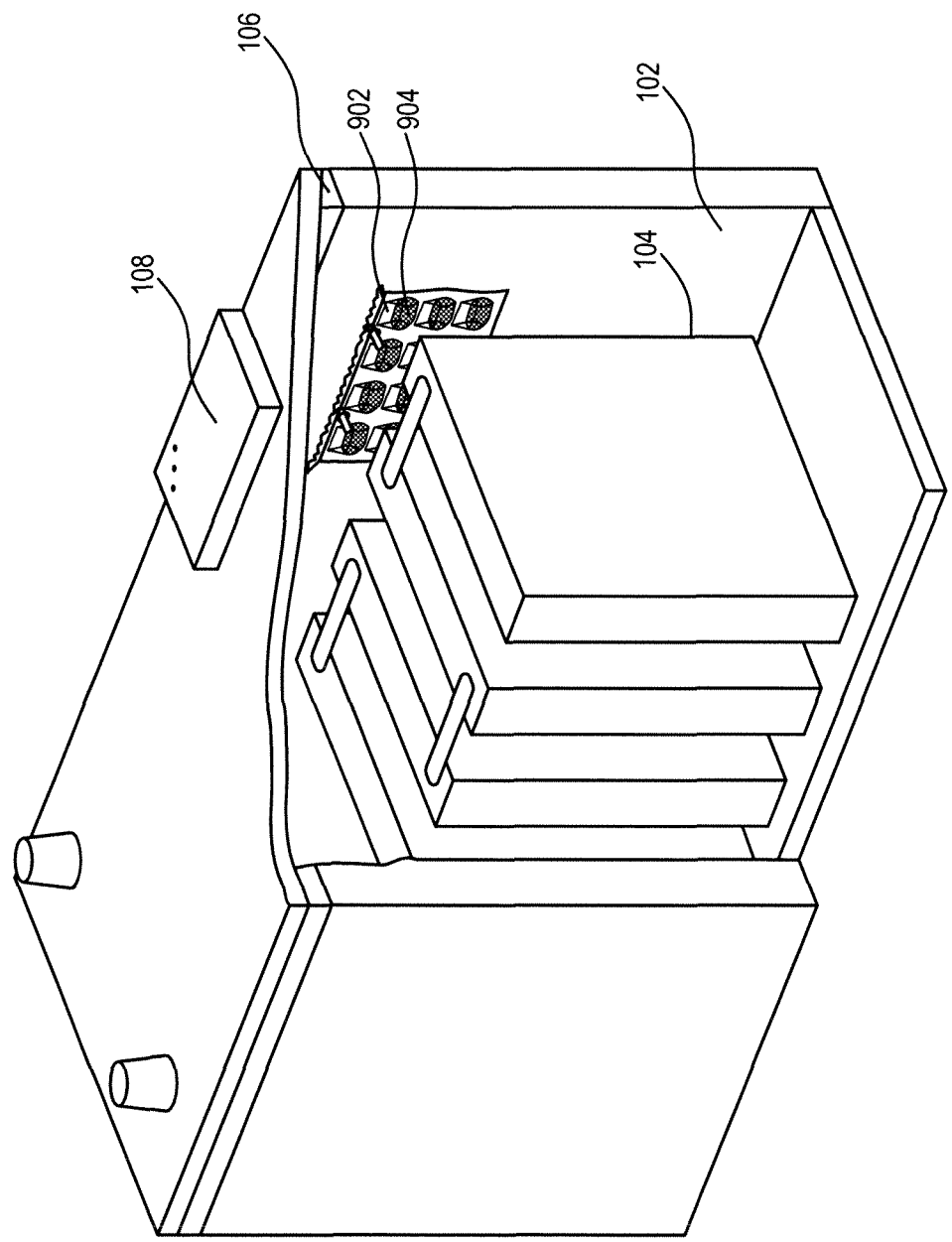
FIG. 9 illustrates an example battery including an odorant and/or visible indicator material stored in a plurality of sealed volumes.

FIG. 9 illustrates an example battery including an odorant and/or visible indicator material stored in a plurality of sealed volumes. In some embodiments, the storage compartments discussed above may be formed of a plurality of sealed volumes 902. In some embodiments all or part of the sealed volumes may be filled with an odorant and/or visible indicator material 904. In one embodiment, a pliable material having a plurality of regularly spaced sealed volumes 902 (e.g., bubble wrap) may wrap battery components, such as the battery housing 102 or the battery cells 104, and be used to store the odorant and/or visible indicator material. In a case of severe battery damage, more of the sealed volumes 902 may be damaged and a greater amount of odorant and/or visible indicator material may be released, thereby indicating the extent of the damage.

Figure 10:
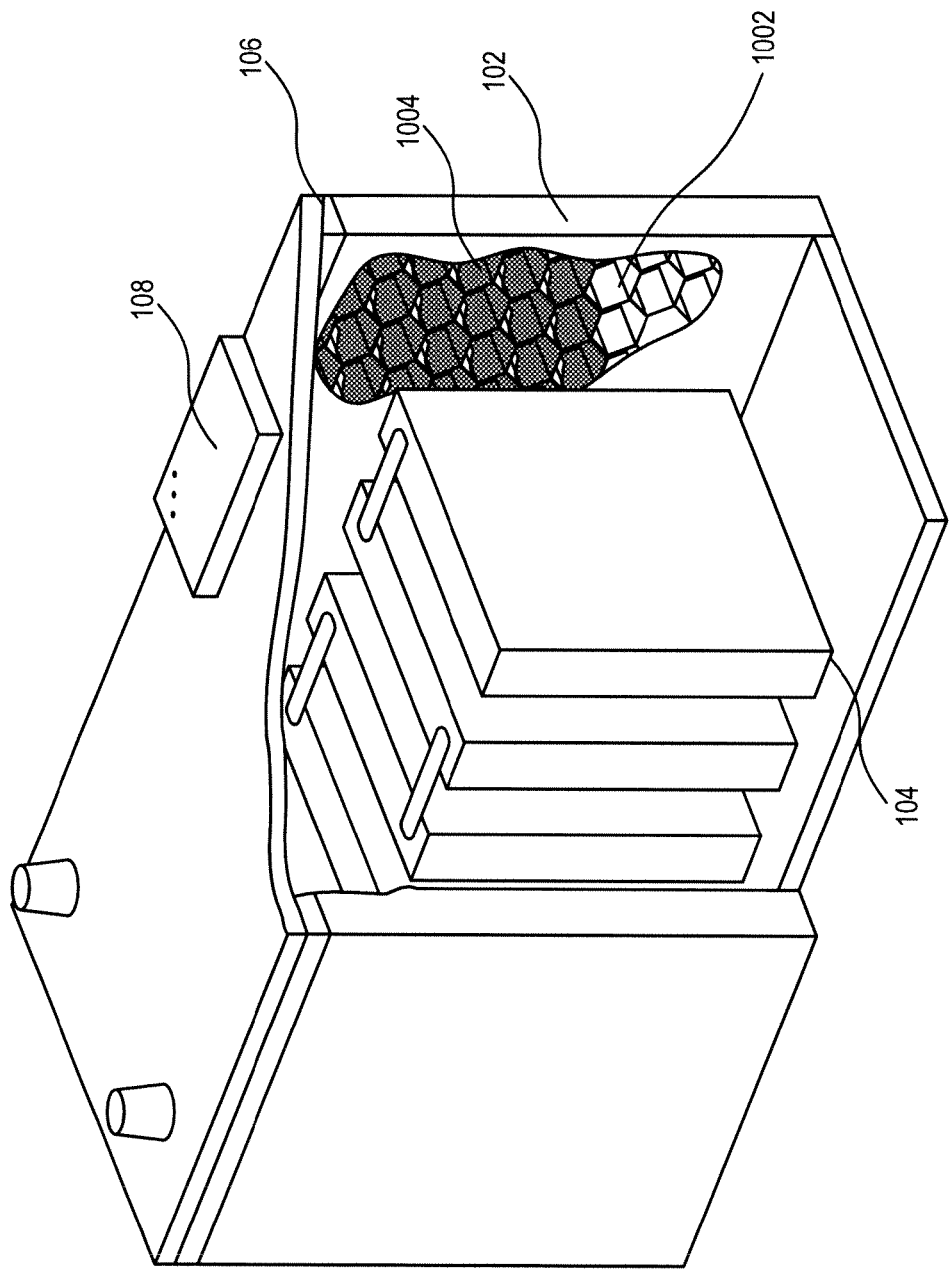
FIG. 10 illustrates an example battery including an odorant and/or visible indicator material stored in a honeycomb structure.

FIG. 10 illustrates an example battery including an odorant and/or visible indicator material stored in a honeycomb structure. Batteries may be constructed using a honeycomb structure in the battery housing 102 and/or battery cells 104. In some embodiments, the chambers 1002 of the honeycomb structures used in the battery may be used to store odorant and/or visible indicator material 1004. As with the plurality of sealed volumes, in a case of severe battery damage, more of the honeycomb structure's chambers 1002 may be damaged and a greater amount of odorant and/or visible indicator material 1004 may be released, thereby indicating the extent of the damage.

Figure 11:
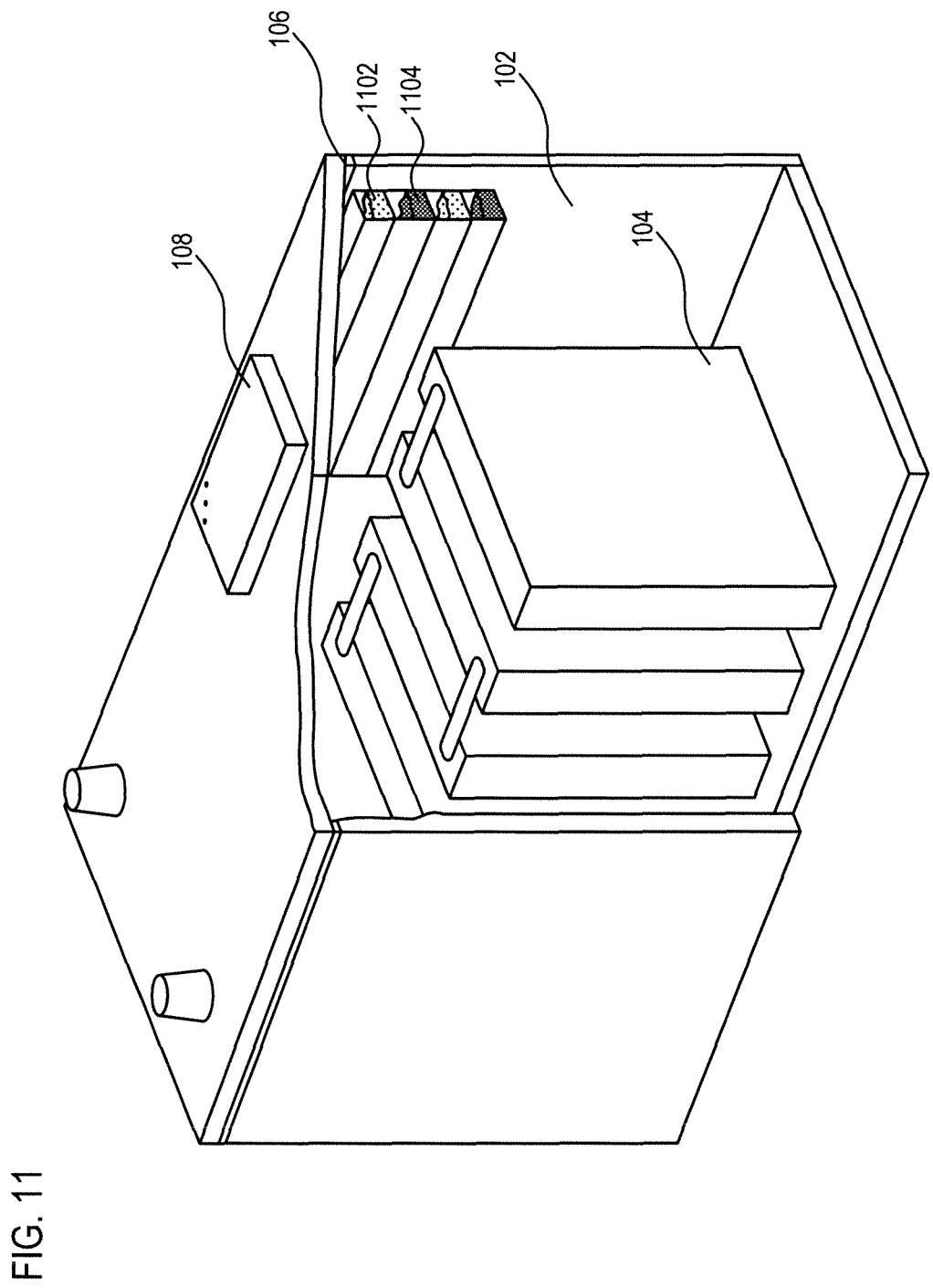
FIG. 11 illustrates an example battery including an odorant and/or visible indicator material comprising a plurality of precursor chemicals.

FIG. 11 illustrates an example battery including an odorant and/or visible indicator material comprising a plurality of precursor chemicals. As describe above, in some embodiments, the battery may include two or more precursor chemicals 1102 and 1104 that are configured to be released in response to battery damage, to react, when mixed, and create the odorant and/or visible indicator material. In other embodiments, the battery may include one or more precursor chemicals configured to react to defined conditions, such as exposure to ambient air or humidity, or heat above a threshold temperature, and create the odorant and/or visible indicator material.

Figure 12:
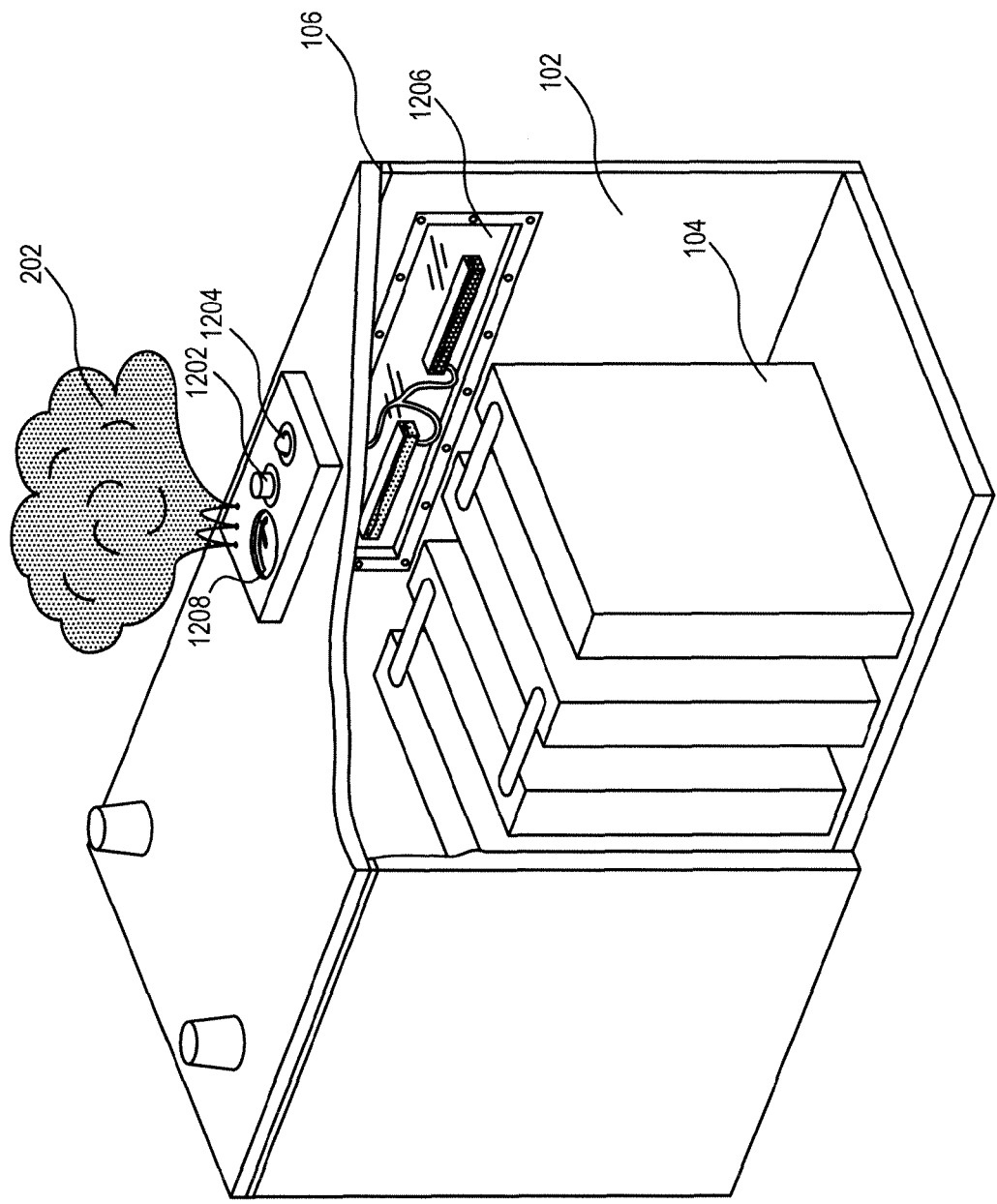
FIG. 12 illustrates an example battery including a battery damage indicator test mechanism.

FIG. 12 illustrates an example battery including a battery damage indicator test mechanism. In various embodiments, a battery that includes an odorant and/or visible indicator material may include a test mechanism in order to test the functionality of the odorant and/or visible indicator material. While FIG. 12 shows various examples of test mechanisms, it should be understood that the test mechanisms may be employed in any combination and with other known test mechanisms not specifically disclosed here. In one embodiment, the battery may include a test mechanism configured to release a test portion of the odorant 202 and/or visible indicator material (not shown) to determine whether the odorant and/or visible indicator material is functional. In some embodiments, the test mechanism may include a mechanical actuator, such as push button 1202, configured to initiate a test of the odorant and/or visible indicator material. In other embodiments, the test may be initiated by an electrical signal, a thermal event, etc. In some embodiments, the test mechanism may include a status indicator, such as light 1204, that indicates a condition of the battery based on conditions sensed by sensors throughout the battery. In some embodiments, the test mechanism may include a sight window 1206 so a level of the odorant and/or visible indicator material may be visually inspected. In other embodiments, the test mechanism may include a pressure gauge 1208 configured to indicate a pressure of odorant and/or visible indicator material stored in the battery.

Figure 13:
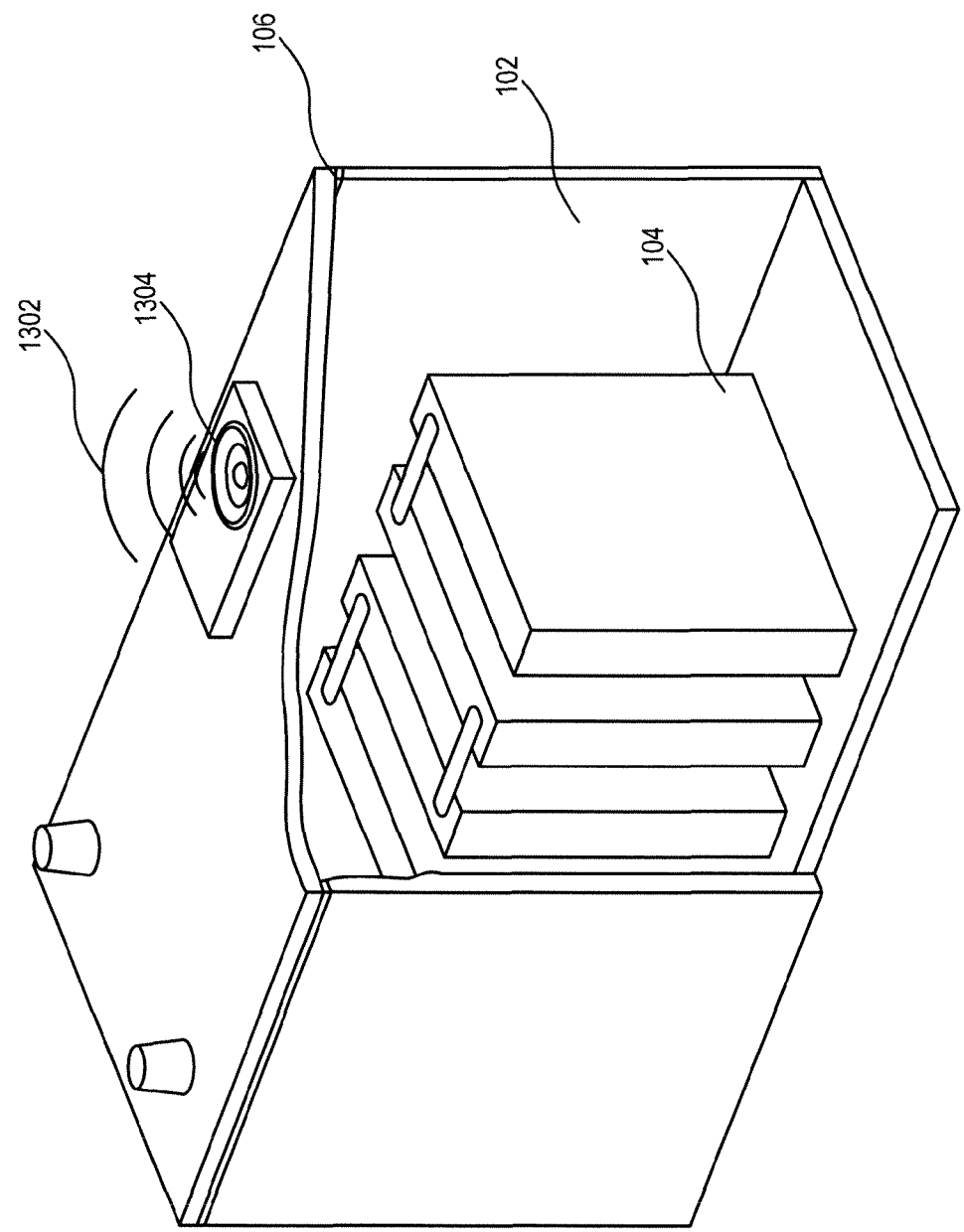
FIG. 13 illustrates an example battery including a battery damage indicator configured to emit an audible alarm in response to battery damage.
Figure 14:
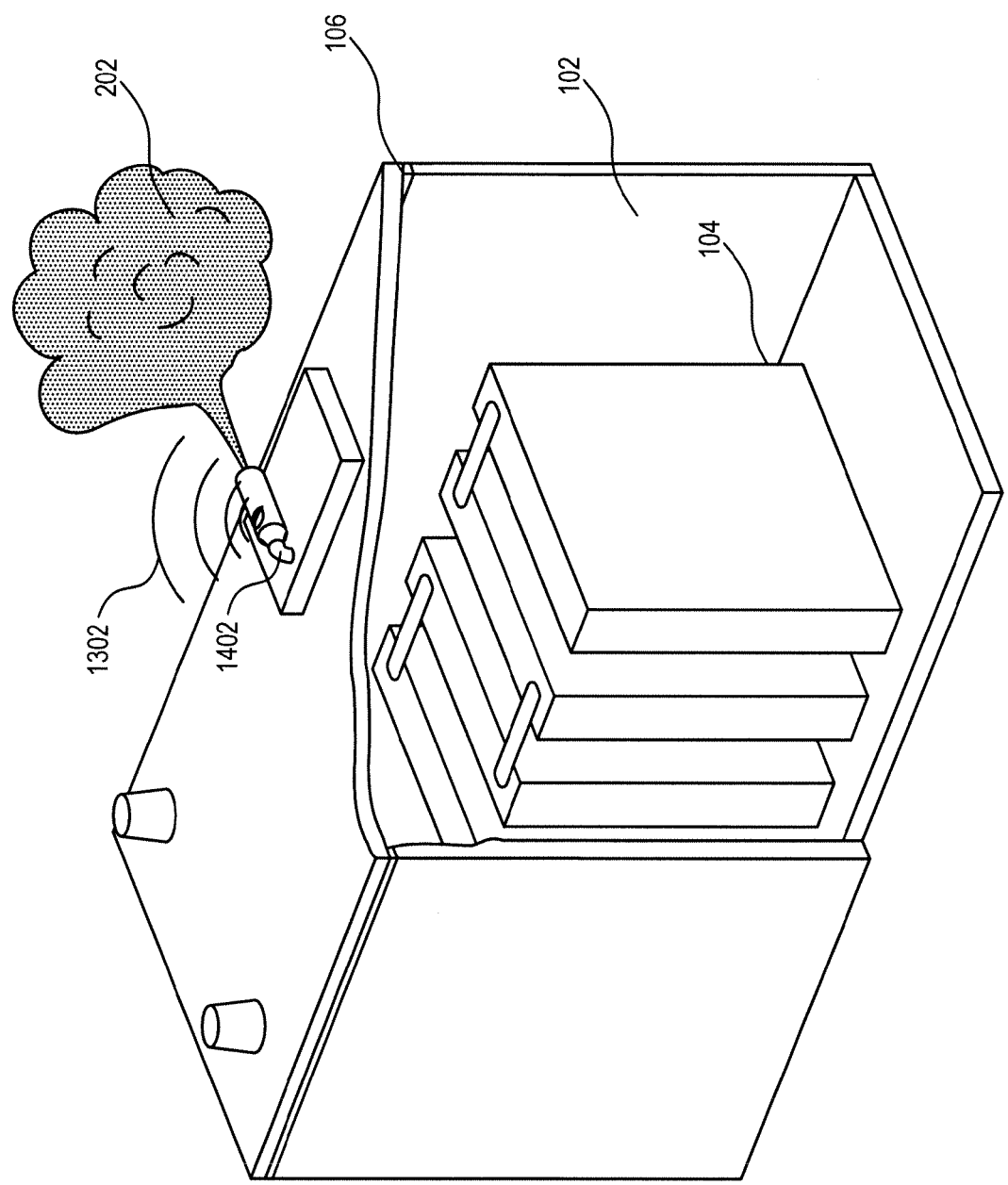
FIG. 14 illustrates an example battery including a battery damage indicator configured to emit an audible alarm in response to battery damage.

FIGS. 13 and 14 illustrate an example battery including a battery damage indicator configured to emit an audible alarm in response to battery damage. In various embodiments, the battery, in combination with or separate from releasing an odorant and/or visible indicator material, may indicate battery damage by producing an audible alarm (depicted in the example of FIG. 13 as sound waves 1302). In one embodiment, the battery damage indicator may include a speaker 1304 or other audible alarm producing element. As shown in FIG. 14, the audible alarm 1302 may be produced by the odorant 202 and/or visible indicator material venting through an aerophone 1402.

Figure 15A:
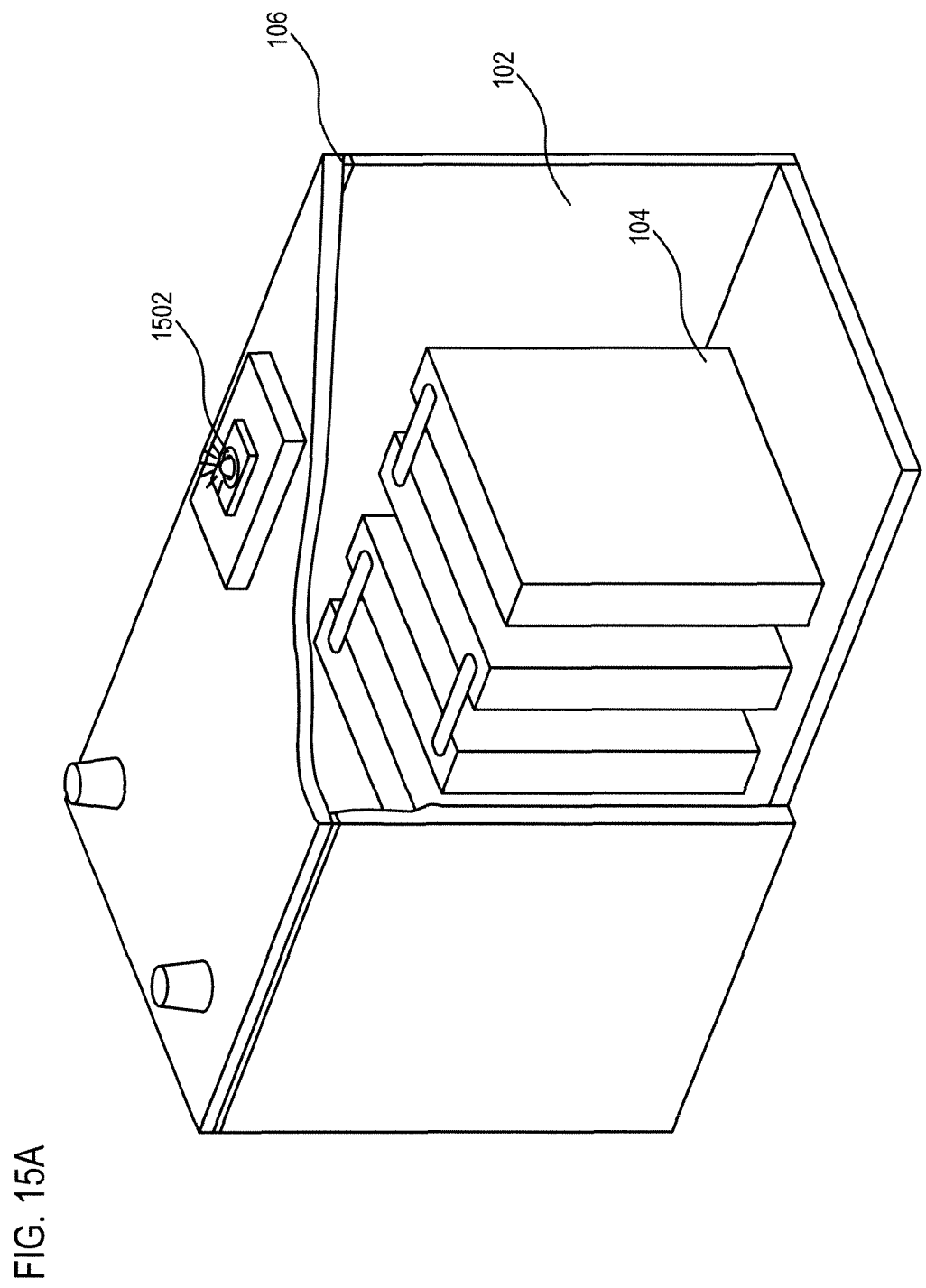
FIG. 15A illustrates an example battery including a battery damage indicator configured to provide an electrical signal in response to battery damage.
Figure 15B:
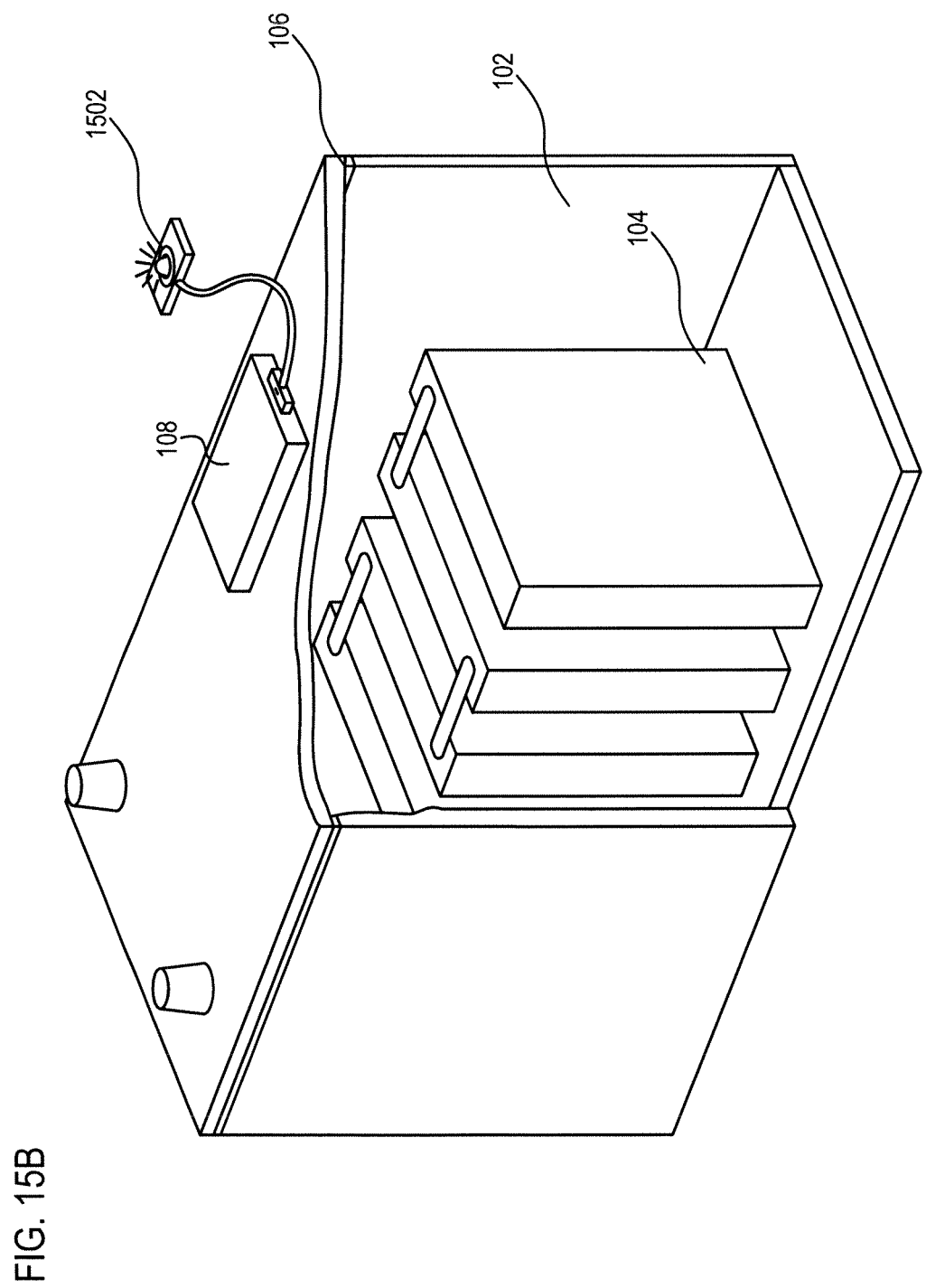
FIG. 15B illustrates an example battery including a battery damage indicator configured to provide an electrical signal in response to battery damage.

FIGS. 15A and 15B illustrate an example battery including a battery damage indicator configured to provide an electrical signal in response to battery damage. In various embodiments, the battery, in combination with or separate from releasing an odorant and/or visible indicator material, may indicate battery damage by producing an electrical signal. In some embodiments, the electrical signal may be provided by closing a contact in response to detecting battery damage. In other embodiments, the electrical signal may be provided by the active sensors, such as an accelerometer, a strain sensor, a sensor configured to detect the presence of the odorant and/or visible indicator material, etc., as discussed above. The electrical signal may be, for example, an analog signal such as a voltage, a digital signal, or the like. As illustrated in the example of FIG. 15A, the electrical signal may be used to provide, at the battery, an indication 1502 of battery damage. As illustrated in the example of FIG. 15B, the electrical signal may be used to provide, at a location remote from the battery, an indication 1502 of battery damage. The electrical signal may include information relating to the condition of the battery which may be displayed locally or remotely.

Figure 16A:
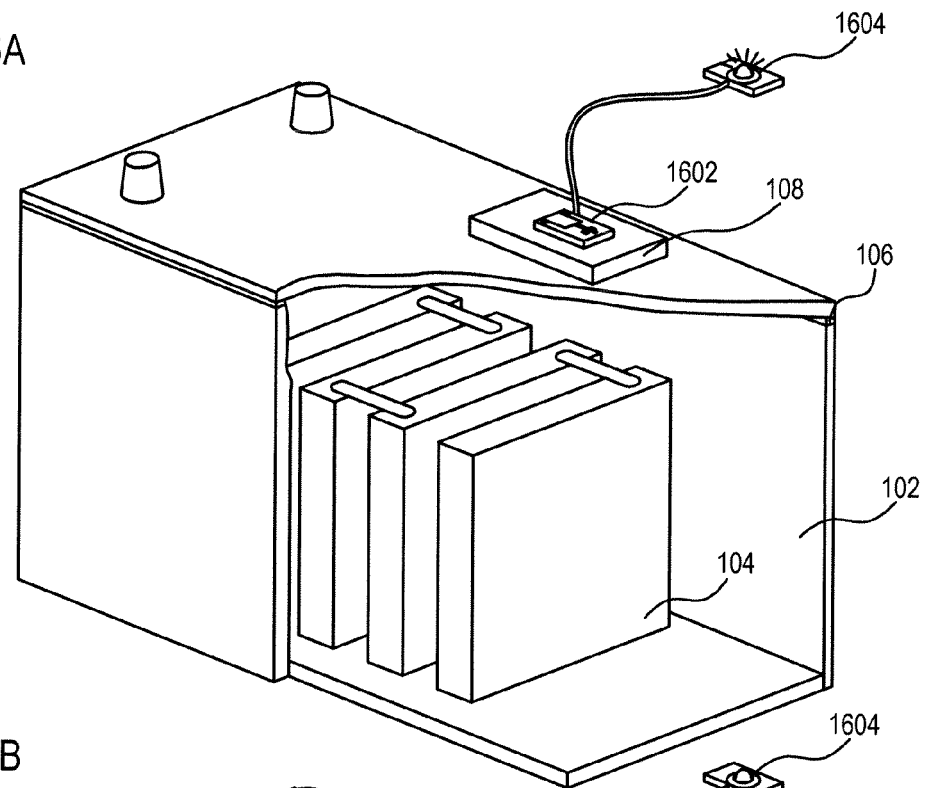
FIG. 16A illustrates an example battery including a battery damage indicator configured to stop sending an electrical signal in response to battery damage.
Figure 16B:
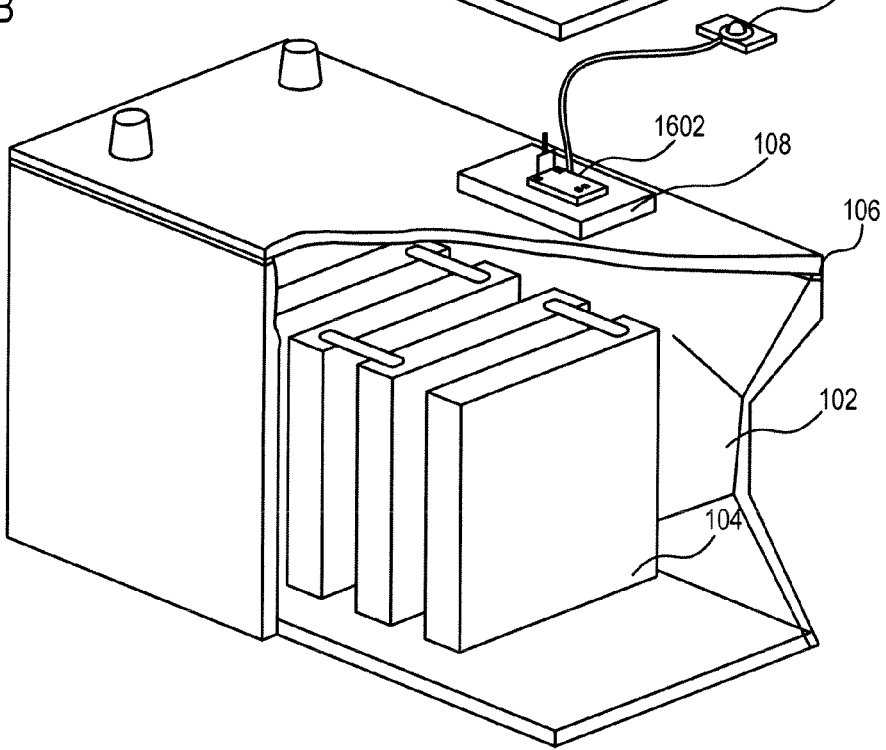
FIG. 16B illustrates an example battery including a battery damage indicator configured to stop sending an electrical signal in response to battery damage.

FIGS. 16A and 16B illustrate an example battery including a battery damage indicator configured to stop sending an electrical signal in response to battery damage. As illustrated in the example of FIG. 16, the battery may be configured to continuously send an electrical signal during normal operation of the battery. The battery damage indicator may include a switch 1602, or the like, that is closed during normal operation and which provides an electrical signal to an indicator 1604 that the battery is operating normally. In response to battery damage, as illustrated in FIG. 16B, the switch may be moved an open position and the indication of normal battery operation is no longer received at the indicator 1604.

Figure 17:
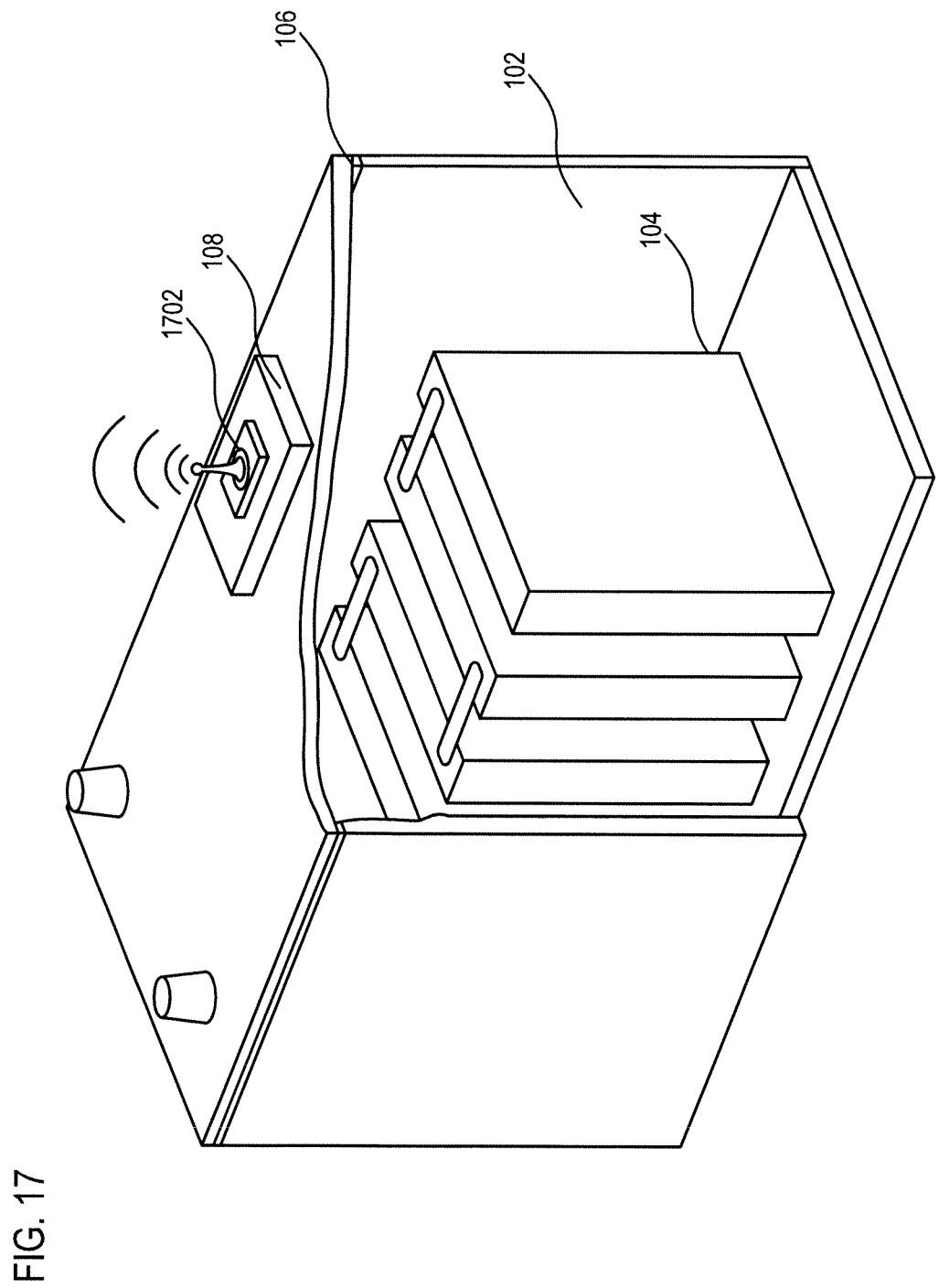
FIG. 17 illustrates an example battery including a battery damage indicator configured to provide a radio signal in response to battery damage.

FIG. 17 illustrates an example battery including a battery damage indicator configured to provide a radio signal in response to battery damage. In some embodiments, the battery may be configured to emit a radio signal 1702. The radio signal may include information relating to the condition of the battery, for example whether battery damage has been detected.

This disclosure has been made with reference to various example embodiments, including the best mode. However, those skilled in the art will recognize that changes and modifications may be made to the example embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined by the following claims.

What is claimed is:

1. A battery comprising:
a battery housing;
an external set of battery terminals coupled to the battery housing;
a battery cell disposed in the battery housing; and
an odorant stored within the battery housing having the external set of battery terminals coupled thereto and stored separately from an electrolytic solution of the battery cell, wherein the battery is configured to release the odorant from inside of the battery housing to the atmosphere in response to battery housing damage, damage to the battery cell, deformation of the battery, or damage to one or more seals within the battery.

2. The battery of claim 1, wherein the battery is further configured to release a visible indicator in response to battery damage.

3. The battery of claim 2, wherein the visible indicator comprises the odorant.

4. The battery of claim 1, wherein the odorant comprises a liquid.

5. The battery of claim 1, wherein the battery is configured to store the odorant under pressure.

6. The battery of claim 1, wherein the battery comprises a dedicated container configured to store the odorant.

7. The battery of claim 1, wherein the battery comprises a sealed wrapper configured to store the odorant, and wherein the sealed wrapper at least partially surrounds the battery cell.

8. The battery of claim 1, wherein the battery comprises a plurality of storage compartments for storing the odorant.

9. The battery of claim 1, wherein the odorant comprises a plurality of precursor chemicals.

10. The battery of claim 9, wherein the precursor chemicals are configured to react in response to being mixed.

11. A battery comprising:
a battery housing;
an external set of battery terminals coupled to the battery housing;
a battery cell disposed in the battery housing;
an odorant stored within the battery housing having the external set of battery terminals coupled thereto and stored separately from an electrolytic solution of the battery cell; and
a damage sensor configured to release the odorant from inside of the battery housing to the atmosphere in response to battery damage.

12. The battery of claim 11, wherein the damage sensor comprises an accelerometer configured to detect when the battery is damaged based on a measured acceleration of the battery.

13. The battery of claim 11, wherein the damage sensor comprises a force meter configured to detect when the battery is damaged based on a measured force applied to the battery.

14. The battery of claim 11, wherein the damage sensor comprises a strain sensor configured to detect when the battery is damaged based on a measured strain on the battery.

15. The battery of claim 11, wherein the damage sensor comprises an electrolyte sensitive actuator configured to detect when the battery is damaged based on the presence of electrolyte outside of the battery cell.

16. The battery of claim 11, wherein the damage sensor comprises a chemical sensor configured to detect when the battery is damaged based on the presence of electrolyte outside of the battery cell.

17. The battery of claim 11, wherein the battery damage is a battery temperature that exceeds a threshold temperature for the battery.

18. The battery of claim 11, wherein the damage sensor is further configured to emit an audible alarm in response to detecting the battery damage.

19. The battery of claim 18, wherein the battery comprises an aerophone, and wherein the audible alarm is created by the odorant venting through the aerophone.

20. The battery of claim 11, wherein the damage sensor is further configured to provide an electrical signal in response to the battery damage.

21. The battery of claim 11, wherein the damage sensor is further configured to provide a radio signal in response to the battery damage.

22. The battery of claim 11, wherein the battery comprises a sealed wrapper configured to store the odorant, and wherein the sealed wrapper at least partially surrounds the battery cell.

23. The battery of claim 1, wherein the battery comprises a plurality of storage compartments for storing the odorant, and wherein the plurality of storage compartments comprises microsphere compartments.

24. The battery of claim 1, wherein the battery housing comprises a honeycomb battery housing and wherein chambers of the honeycomb battery housing are filled with the odorant.

25. The battery of claim 1, wherein the battery comprises a plurality of storage compartments storing a visible indicator material and the odorant.

26. The battery of claim 25, wherein each of the plurality of storage compartments comprises a pliable material including a sealed volume, and wherein the plurality of storage compartments are regularly spaced.

* * * * *